UNITED STATES PATENT OFFICE.

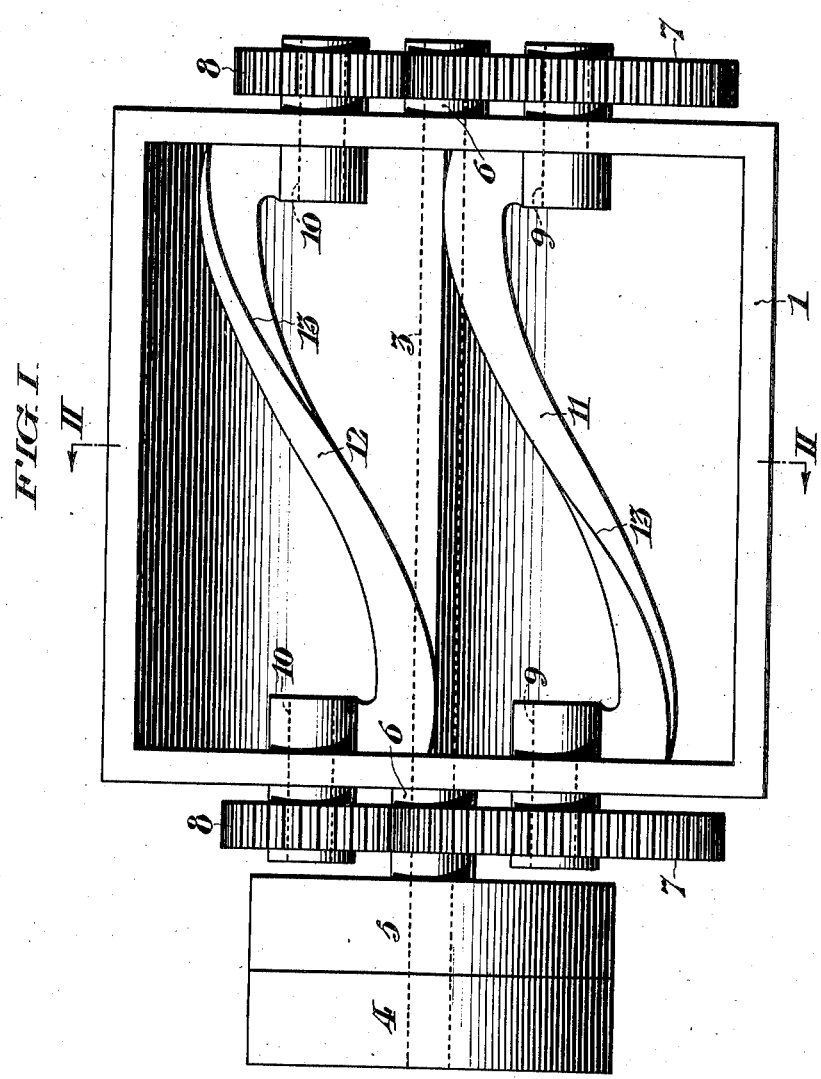

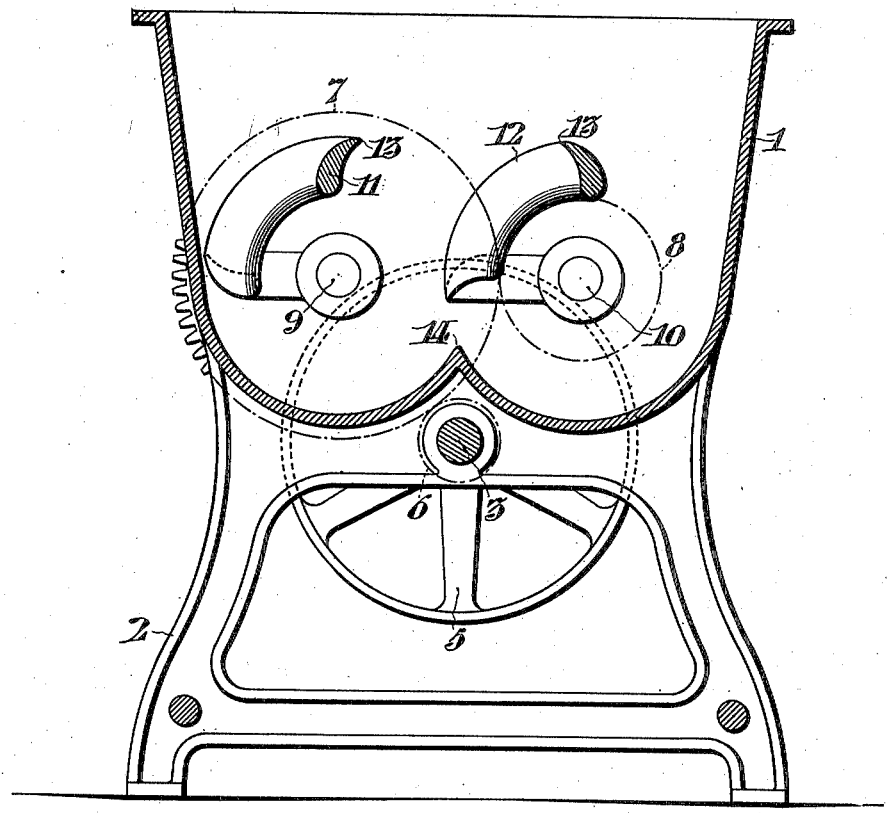

JAMES D. DARLING, OF PHILADELPHIA, PENNSYLVANIA, ASSIGNOR TO KEYSTONE TRADING COMPANY, A CORPORATION OF NEW JERSEY.

MANUFACTURE OF CHEWING-GUM.

947,635. Specification of Letters Patent. Patented Jan. 25, 1910.

Original application filed December 31, 1907, Serial No. 408,721. Divided and this application filed July 2, 1908. Serial No. 441,517.

*To all whom it may concern:*

Be it known that I, JAMES D. DARLING, of Philadelphia, in the county of Philadelphia and State of Pennsylvania, have invented certain new and useful Improvements in the Manufacture of Chewing-Gum, whereof the following is a specification, reference being had to the accompanying drawings.

Hitherto chewing gum has been manufactured from certain resinous gums, notably from spruce gum or from gum chicle. These substances possess by nature the required consistency and especially the high degree of ductility and plasticity with absence of resiliency, which is necessary for a masticatory gum.

I have discovered that a substance having similar qualities to the above and suitable for the same purposes, may be manufactured from certain low grade rubbers. Ordinarily rubber or caoutchouc in all its forms is unsuited for mastication, because of its toughness and high resiliency. It also usually has a disagreeable taste and odor. Low grade rubbers are characterized by the presence of a high percentage of resin, but by reason of the rubber which they contain cannot ordinarily be used in the manufacture of chewing gum. I have found that by the process which I will describe, it is possible to convert such a low grade rubber into a superior masticatory gum. To accomplish this, it is necessary to cleanse and purify the crude product, whenever, as is usually the case, it is accompanied by impurities which give it a disagreeable taste or odor. It is also necessary to render the rubber content less tough and resilient. By the process which I have discovered, I accomplish both these ends, whereby I am able to produce from cheap low grade rubber an entirely satisfactory masticatory gum, having the peculiar cohesiveness, plasticity, and ductility which is required, not adhesive to the teeth, not tough, and not resilient and also odorless and tasteless.

In the present specification the word "resiliency", is used to denote that quality, highly characteristic of india rubber, by which it completely restores or reforms itself after distortion by a given strain, as soon as the strain is removed. It is opposed to plasticity, by which is meant the capacity to receive and maintain new forms. Chewing gum must be plastic and non-resilient.

The rubber which I have found most suitable for conversion into chewing gum by my process is known in the trade as "pontianak", an india rubber procured from Borneo, and sometimes known as "gutta-jelutong", and under these names largely imported into this country. Analysis of commercial pontianak shows that exclusive of water, it usually contains about 75% of resin, something over 24% of rubber, and a fraction of 1% of ash. Authorities however, state that at times the resin content may reach 90%. This material as imported into this country, is entirely unsuitable for use as a chewing gum, not only because of the impurities which it contains, but because the rubber content renders it too tough and too resilient. But by subjecting this material to the process of treatment which I will describe, I am able to produce an exceedingly desirable chewing gum at a low price.

In practicing my process I take the crude pontianak of commerce, and after cleaning it, cut or chip it up into small pieces, preferably by a mechanical cutter. This comminuted material is then placed in a suitable receptacle and there boiled for a considerable time in an alkaline solution. For this purpose the use of twenty-five pounds of caustic soda to one hundred gallons of water will produce the proper result. The boiling is continued until all the impurities present in the crude article have sunk to the bottom, while the mixture of rubber and resin, purified and considerably changed in its physical characteristics, floats at or near the surface as a spongy mass. When freed from the alkaline liquor this mass is odorless and tasteless, but still somewhat tough and resilient. This product is removed and after repeated washings is subjected to a "pulling" or kneading operation, by which its physical qualities are further changed. For this purpose I prefer to use the apparatus shown in the accompanying drawings, in which—

Figure I, is a plan view of an apparatus which can be conveniently employed to carry out my process, and Fig. II, is a cross section of the same, taken on the lines II, II, in Fig. I.

In the drawings, 1, is a hopper mounted on standards 2. A shaft 3, is conveniently journaled in said standards 2, and carries the tight and loose pulleys 4, and 5, and also the pinions 6, 6, which are keyed thereto adjacent to each end of the hopper 1. Pinions 6, 6, transmit motion to the gears 7, 7, which in turn mesh with the gears 8, 8. Gears 7, 7, and 8, 8, are fast upon trunnions 9, 9, and 10, 10, to which are fastened the revolving blades 11, and 12, respectively. Said blades 11, and 12, are spiral in form and their sharp edges 13, are adapted to shear against the edge 14, on the bottom of hopper 1, as can be clearly seen in Fig. II. The blade 12, revolves in an opposite direction to and twice as fast as the blade 11, by virtue of the relation of the gears 7, 7, to the gears 8, 8, thus thoroughly mixing by a combined shearing and tearing action.

It will be understood that the machine above described forms no part of my invention but is well adapted to perform the pulling, cutting and kneading which is necessary during my process. During the treatment of the material in this apparatus it is maintained at a temperature of between 200° and 300° Fahrenheit.

The treatment is continued for a considerable time, determined by observation, and as a result the physical characteristics of the rubber are markedly changed. The rubber content of the mass will be found to have lost its toughness and resiliency and the mass will have become plastic, tenacious and extremely ductile, so that it may be pulled out in fine threads of almost indefinite length with little or no resiliency, and these qualities are retained by it for a long time. This product is eminently suited for use in the manufacture of chewing gum. I find that under some circumstances, the substance is improved by the addition thereto of about five per cent. of a pure vegetable wax or some other similar waxy substance. This may be introduced in the mixer and aids in giving the product precisely the required consistency. If desired, suitable flavoring or coloring extracts may be added in the course of the same operation.

The profound change in india rubber which follows the combined treatment of heating and mechanical kneading has, so far as I am aware, never been utilized in this art, because this extraordinary physical behavior is not at present understood, and my invention consists in utilizing this method of increasing the plasticity of the rubber content of a low grade rubber at the expense of its elasticity to thus convert said low grade rubber into a chewing gum, to which end the large resin content of the low grade rubber materially aids. The method of purifying the commercial low grade rubber which I have described is also of my invention, and, as I believe, novel.

The present application is a division of the application Serial No. 408,721, filed by me under date of December 31st, 1907, and in which I claim the new product which results from my process.

Having thus described my invention, I claim:

1. The process of converting a low grade rubber, containing a high percentage of resin, into a masticatory gum which consists in subjecting it to a continued kneading operation while maintained at a temperature of two or three hundred degrees Fahrenheit, whereby the resiliency of the rubber content is destroyed and the mass is rendered plastic.

2. The process of converting a low grade rubber, containing a high percentage of resin, into a masticatory gum which consists in boiling it in a comminuted state in an alkaline solution and then subjecting it to a continued kneading operation while maintained at a temperature of two or three hundred degrees Fahrenheit, whereby the resiliency of the rubber content is destroyed and the mass is rendered plastic.

3. The process of manufacturing chewing gum which consists in purifying crude pontianak rubber; and then kneading it while maintained at a temperature of about two or three hundred degrees Fahrenheit until the resiliency of the rubber is destroyed and the mass is rendered plastic.

In testimony whereof, I have hereunto signed my name, at Philadelphia, Pennsylvania, this twenty-seventh day of June, 1908.

JAMES D. DARLING.

Witnesses:
JAMES H. BELL,
E. L. FULLERTON.